United States Patent [19]

Kurihara

[11] 4,409,562

[45] Oct. 11, 1983

[54] PHASE CORRECTION CIRCUIT EMPLOYING BANDPASS FILTERS

[75] Inventor: Hiroshi Kurihara, Tokyo, Japan

[73] Assignee: Fujitsu Limited, Kawasaki, Japan

[21] Appl. No.: 269,860

[22] Filed: Jun. 3, 1981

Related U.S. Application Data

[63] Continuation-in-part of Ser. No. 202,444, Aug. 6, 1980, abandoned.

[30] Foreign Application Priority Data

Aug. 12, 1978 [JP] Japan ................... 53-152342

[51] Int. Cl.³ .......................... H03D 3/18; H03L 7/00
[52] U.S. Cl. ........................ 331/1 A; 331/25;
307/511; 328/155; 329/50; 329/122
[58] Field of Search .............. 331/1 A, 18, 25;
307/262, 511, 513, 358; 328/55, 155, 167;
329/122-124, 50

[56] References Cited

U.S. PATENT DOCUMENTS 4,310,803  1/1982  Kurihara et al. ................. 328/167

FOREIGN PATENT DOCUMENTS 54-37454  3/1979  Japan ................................ 329/123

Primary Examiner—Siegfried H. Grimm
Assistant Examiner—Edward P. Westin
Attorney, Agent, or Firm—Staas & Halsey

[57] ABSTRACT

In order to improve the phase skipping characteristic and the transient response characteristic when using a tracking filter to regenerate the carrier from a PSK signal, a pair of output points having different equivalent noise bandwidths are set by using a first filter having a broad equivalent noise bandwidth and a second filter having a narrow bandwidth. The phase difference between the output points is detected by a phase detector, the phase of the signal at the output point having the broader noise equivalent bandwidth being changed by a phase shifter if a phase difference is detected. The filters and associated circuitry can be connected in either parallel or serial configuration, and the frequency division necessary in the tracking filter can be accomplished in more than one stage to simplify the phase shifting requirement. Additionally either channel switching or polarity inversion of the demodulated baseband signal, or both, can be performed on the basis of such phase differences.

12 Claims, 11 Drawing Figures

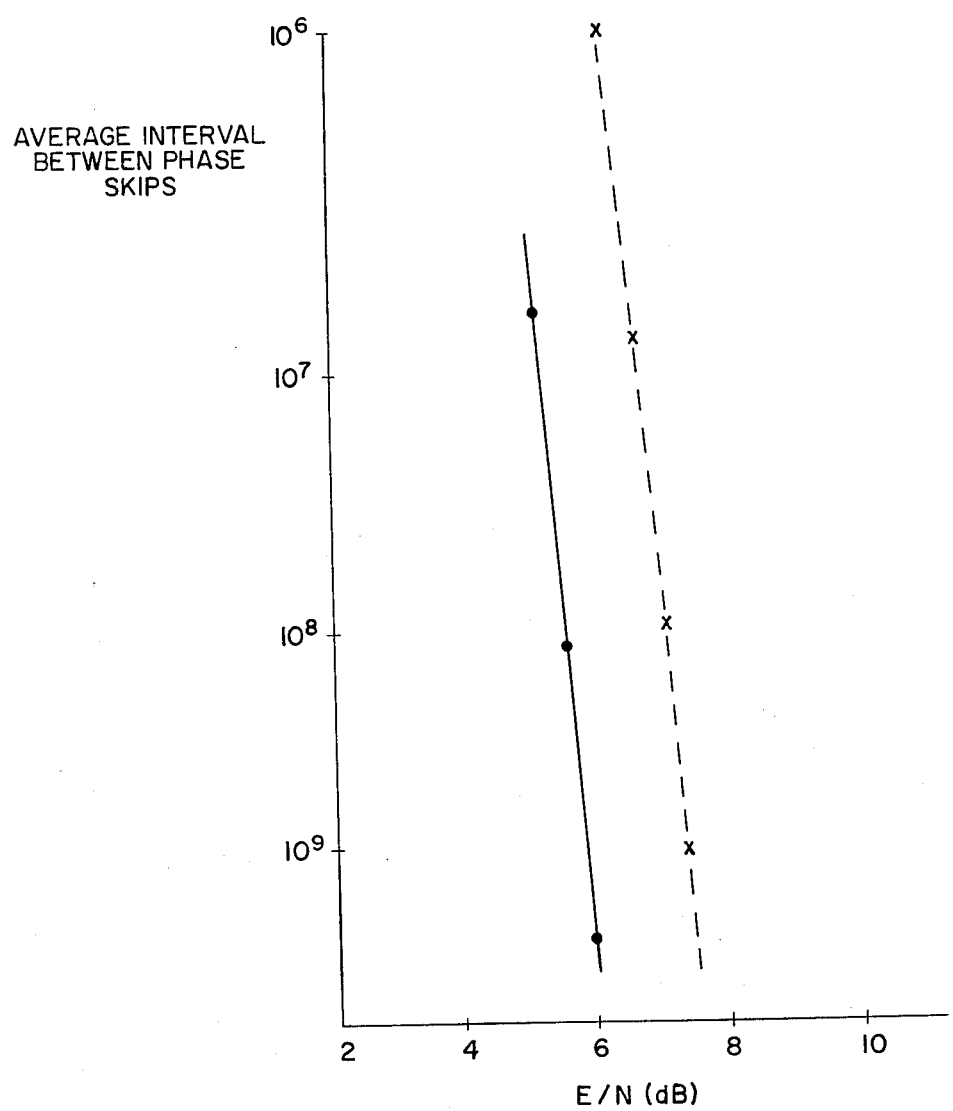

PHASE CORRECTION CIRCUIT EMPLOYING BANDPASS FILTERS

CROSS-REFERENCE TO RELATED APPLICATIONS

This application is a continuation-in-part of application Ser. No. 202,444, filed Aug. 6, 1980, now abandoned, which resulted from an International Application designating the U.S., Ser. No. PCT/JP79/00310, filed Dec. 5, 1979.

BACKGROUND OF THE INVENTION

This invention relates to a phase correction circuit which can reduce the generation rate of phase skips in a circuit which regenerates the carrier from a PSK-modulated signal, without adversely effecting transient response.

In a system called the multiplication system, a bandpass filter with a narrow frequency band can be used for noise suppression. It is already known that a phenomenon called phase skipping or slipping occurs unless a sufficiently narrow frequency bandwidth can be realized for the bandpass filter used in these systems. In a 4-phase PSK system, for example, this phenomenon provides sudden phase changes of 180° or ±90° in the regenerated carrier. If the phenomenon occurs in a system wherein demodulation is performed by means of coherent detection, all data in the subsequent period become erroneous. Therefore, the generation rate of the phenomenon must be minimized. The simplest method of obtaining such a minimized generation rate is to make the frequency bandwidth of the bandpass filter used for noise suppression sufficiently small, but this introduces defects. FIG. 1 is a conventional circuit for regenerating the carrier from an N-phase PSK signal. In this figure, 11 is an N-times multiplication circuit; the part surrounded by the dotted line is a circuit called tracking filter 12; 13 is a 1/N divider; 14 is a bandpass filter; 15 and 16 are frequency converters; 17 is a phase detector; 18 is a voltage controlled oscillator and 19 is an N-times multiplication circuit.

It is already well known that if filter 14 has a sufficiently narrow frequency bandwidth, the generation rate of the phase skipping which occurs when the signal frequency is divided by divider 13 will be reduced.

When this circuit is used, for example, in the burst mode wherein the signal is intermittent, the transient response must be taken into account since this circuit employs a feedback control system. In order to improve this characteristic, it is necessary to widen the frequency bandwidth of bandpass filter 14. Therefore, it has been very difficult to produce a filter circuit which simultaneously satisfies both the phase skipping characteristic and the transient response characteristic.

SUMMARY OF THE INVENTION

With such a background, it is an object of the present invention to offer a phase correction circuit which minimizes phase skipping of the regenerated carrier without adversely effecting the transient response characteristic.

Another object of the invention is to provide a phase correction circuit employing a simplified phase shifter to correct phase errors.

Another object of the invention is to provide a phase correction circuit wherein either the polarity or the channel of the baseboard signal, or both, can be inverted to correct phase shifts.

These and other objects of the invention can be attained by providing a phase correction circuit having both a broad bandwidth filter for good transient response and a narrow bandwidth filter for good phase skipping response, the phase being corrected by shifting the signal having superior transient response when a phase skip is detected. The frequency division can be accomplished in more than one stage if necessary in order to recover the original input frequency. Circuitry for channel switching the baseband signal or inverting its polarity or both can be employed to correct the baseband signal when phase skips are detected.

BRIEF DESCRIPTION OF DRAWINGS

FIG. 9 shows the effects of the present invention.

DESCRIPTION OF THE PREFERRED EMBODIMENTS

The present invention will be explained in detail hereinunder based on the preferred embodiments.

Figure 1:
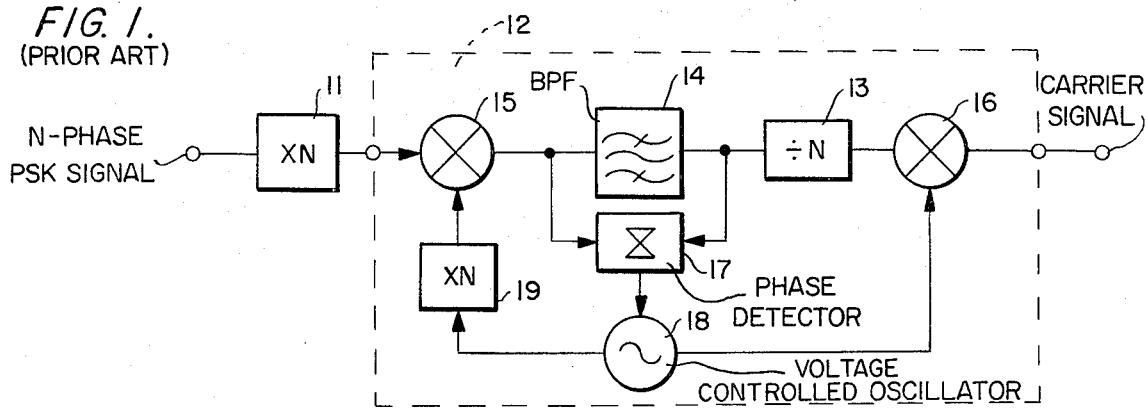
FIG. 1 shows an existing typical carrier regeneration circuit.
Figure 2A:
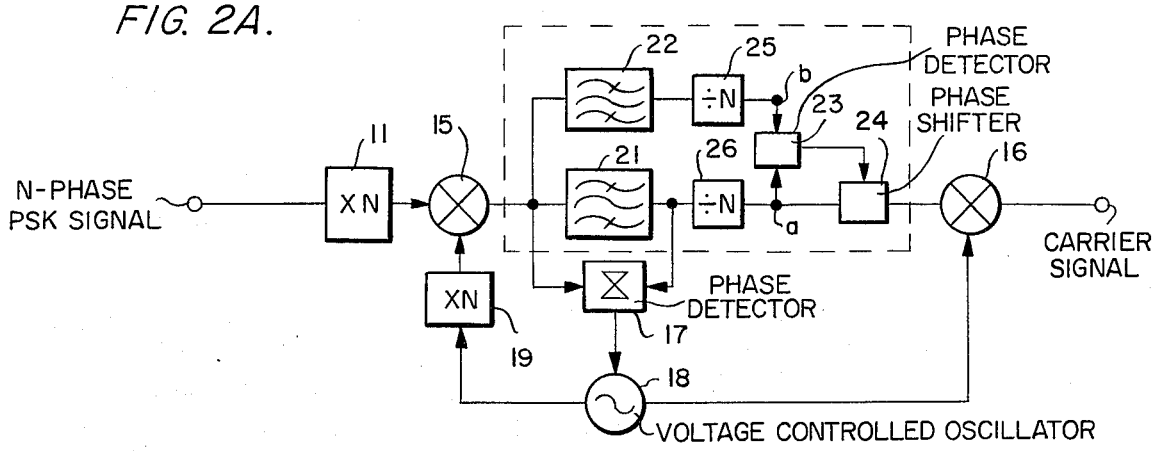
FIG. 2A shows a first embodiment of the carrier regeneration circuit of the present invention.

FIG. 2A shows a first embodiment of the present invention. In this figure, 21 and 22 are bandpass filters; 23 is a phase detector; 24 is a phase shifter; 25 and 26 and 1/N dividers; and the same circuits as those in FIG. 1 are given the same numbering.

Also in this figure, the portion surrounded by the dotted line means the part improved by the present invention.

In other words, a circuit consisting of the bandpass filters 21 and 22, phase detector 23, phase shifter 24, and 1/N dividers 25 and 26 is used, in place of the existing bandpass-filter and 14 and 1/N divider 13. In the circuit of FIG. 2A, the frequency bandwidth of the bandpass filter 22 is narrower than that of the bandpass filter 21.

Therefore, the equivalent noise bandwidth of the output which appears at the point a after the input signal passes through the multiplier 11, frequency converter 15, bandpass filter 21, and divider 26, is broader than the equivalent noise bandwidth of the output which appears at the point b. Accordingly, the output at the point a is superior to that of the point b from the standpoint of the transient response characteristic but is inferior from the standpoint of the cycle skipping characteristic.

Here, it is assumed that the cycle slip generation rate at the point b is small enough to be ignored in comparison with the rate at the point a. Since a phase skip takes only discrete values (180° or ±90° in the case of 4-phase modulation), a phase skip can be detected by detecting the phase difference between the points a and b with a phase detector 23. In such a case, the proper phase is restored by means of a phase shifter 24. Thus, the phase skip rate can substantially be lowered.

Figure 3A:
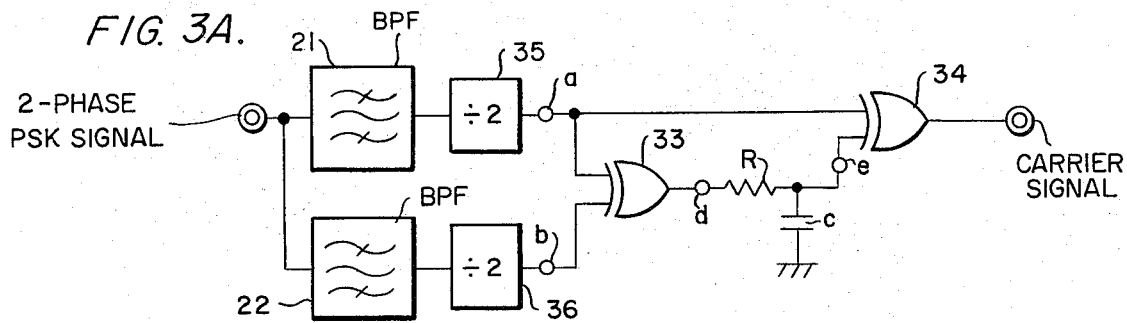
FIG. 3A shows a practical example of the circuit of FIG. 2A.

FIG. 3A shows an embodiment derived from FIG. 2A on the supposition that a variation of 180° occurs as the phase skip, for example, in the case of a 2-phase PSK system. In this circuit, the Exclusive-OR circuit 33 judges whether the phases at the points a and b are in-phase or out-of phase and then the Exclusive-OR circuit 34 permits an inverting or non-inverting rotation of the polarity of the signal appearing at the point a in accordance with such output. At the point d in FIG. 3A, if a phase difference between the points a and b does not become 0° or 180° precisely due to a difference of the characteristics of the bandpass filters 21 and 22, a spike occurs in accordance with such phase difference. Such a spike is smoothed by a resistor R and capacitor C, with the filtered response being supplied to the Exclusive-OR circuit 34, thus allowing an output at the point a to be inverted or non-inverted.

The above process will be explained in more detail using waveforms shown in FIG. 4.

Figure 4:
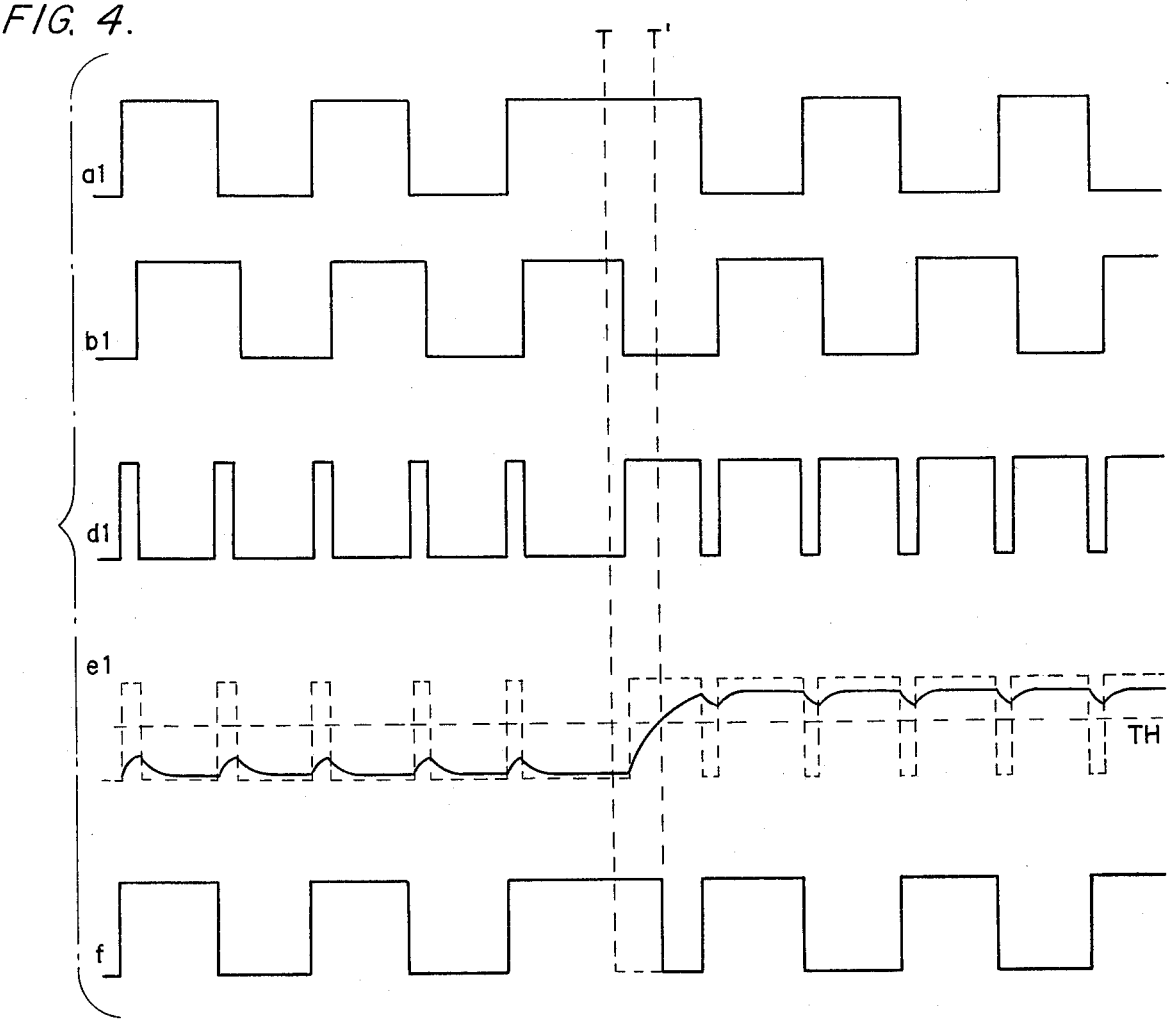
FIG. 4 shows waveforms of individual points of the circuit shown in FIG. 3A.

In FIG. 4, $a_1$ represents a signal at the point a; $b_1$, a signal at the point b; $d_1$, a signal at the point d; $e_1$, a signal at the point e; f, an output signal.

The signal, having passed the bandpass filters 21 and 22, is divided by the divider 35 and 36 into the signals indicated as $a_1$ and $b_1$. The signal $a_1$ at the point a includes less phase deviation due to passing through the wider bandpass filter 21 but undergoes frequent phase skipping. On the other hand, the signal $b_1$ at the point b includes much phase deviation due to passing through the narrower bandpass filter 22 but does not undergo frequent phase skipping.

Next, assume that the signal $a_1$ is leading the signal $b_1$ by about 30° due to the different characteristics of the bandpass filters 21 and 22. When the signals $a_1$ and $b_1$ are received by the Exclusive-OR circuit 33, a spike in accordance with the phase difference is generated from the circuit 33 as signal $d_1$. The signal $d_1$ is smoothed by a smoothing circuit consisting of a resistor R and capacitor C and the signal $e_1$ appears at the point e.

Here, since the signal $a_1$ shows a phase skipping of 180° at the time T (signal polarity is inverted), the signal $e_1$ also crosses the threshold level TH from the lower level "0" to a higher level "1" at time T' shortly after time T.

Since the Exclusive OR circuit 34 receives the signals $a_1$ and $e_1$, the signal $a_1$ directly appears until time T', but the signal $a_1$ is thereafter inverted. In this manner a phase skip appearing at the point a is corrected at the output of the Exclusive-OR circuit 34. In the embodiment of the FIG. 3A, the phase of the carrier is directly inverted by means of the Exclusive-OR circuit.

Figure 2B:
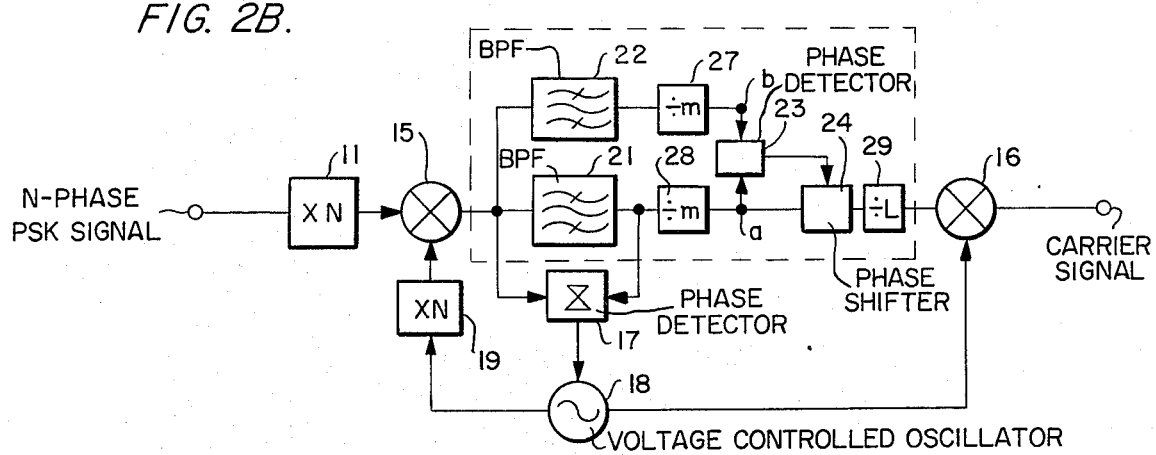
FIG. 2B shows a modification of FIG. 2A which distributes the frequency division in order to allow the use of a simplified phase shifter.
Figure 3B:
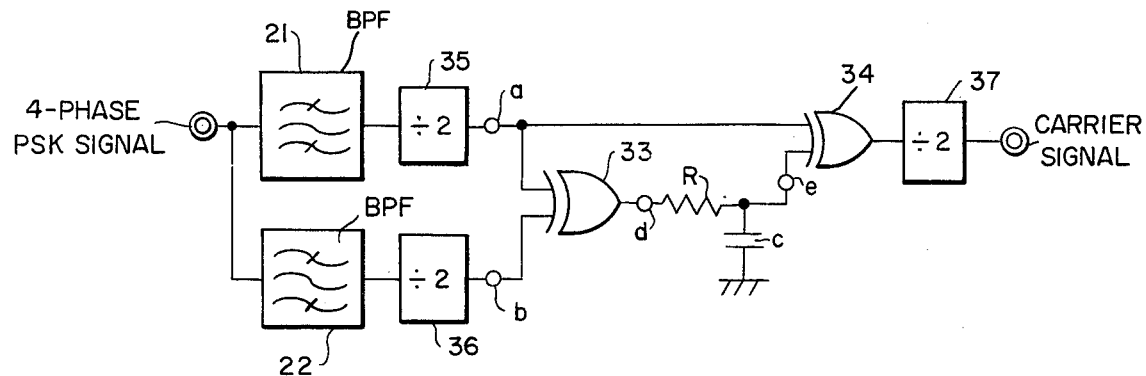
FIG. 3B shows a practical example of the circuit shown in FIG. 2B.

FIG. 2B represents a useful modification of FIG. 2A. In FIG. 2B, however, 1/N dividers 25 and 26 of FIG. 2A have been replaced by 1/M dividers 27 and 28, and 1/L divider 29 has been inserted between phase shifter 24 and frequency converter 16. The numbers M and L are selected so that their product is equal to the multiplication ratio N of circuit 11 ($L \times M = N$), both L and M being equal to or greater than 2 but less than N. With the numbers L and M selected in this way it will be apparent that, in the circuit of FIG. 2B, the net result of dividers 28 and 29 is to divide the bandpass filtered signals by N using two dividers rather than the 1/N divider 26 employed in the circuit of FIG. 2A. Nevertheless the insertion of divider 29 between phase shifter 24 and frequency converter 16 can simplify the overall circuit. For example, if the FIG. 2A configuration were used as the carrier recovery circuit for a 4-phase PSK signal, with N being 4 and with dividers 25 and 26 consequently being ¼ dividers, phase shifter 24 would have to be capable of producing phase changes of 0°, 90°, 180°, and 270°. But by using the configuration of FIG. 2B and letting $L = M = 2$, phase shifter 24 need only be capable of producing phase changes of 0° and 180°. This allows simple circuitry such as an inverter or an Exclusive-OR gate to be employed as phase shifter 24. FIG. 3B illustrates a practical example of the FIG. 2B configuration used in a 4-phase PSK system, the circuitry used to multiply the signal applied to bandpass filters 21 and 22 by N=4 not being shown. The bandpass filtered signals are first divided by 2 by dividers 35 and 36, the phase is corrected, and finally divider 37 divides by 2 again. Little phase skipping occurs at divider 37 compared to that at divider 35.

Figure 5:
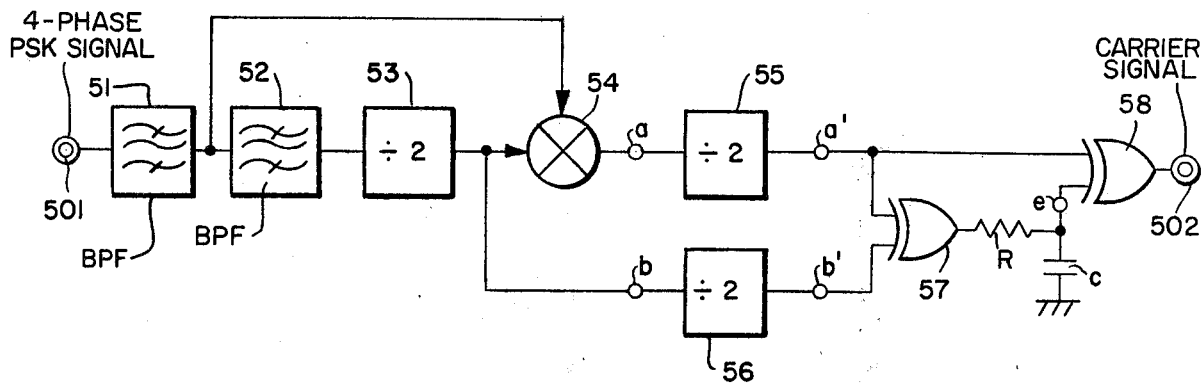
FIG. 5 shows a second embodiment of the invention.

Another embodiment of the present invention is shown in FIG. 5. This circuit shows the filter circuit part of the carrier regeneration circuit in a 4-phase PSK system. In this circuit, 51 and 52 are bandpass filters; 53, 55 and 56 are ½ divider circuits; 54 is a frequency converter; and 57 and 58 are Exclusive-OR circuits. The circuits from the input point 501 to the point a are described in Japanese Patent Application No. 53-102586 and in U.S. application Ser. No. 68,004, filed Aug. 20, 1979, now U.S. Pat. No. 4,310,803. For this reason, the explanation of this portion is simplified hereunder.

A signal obtained by multiplying N times the received PSK signal or by frequency converting the signal is supplied to the bandpass filter 51 via the input point 501. The output of the bandpass filter 51 is divided into two parts; one is directly supplied to the frequency converter 54, while the other is provided to the bandpass filter 52.

The output of the bandpass filter 52 is divided in frequency by 2 and is then delivered to the frequency converter 54. The frequency converter 54 extracts a frequency element which represents the difference between both inputs. Thereby, an output phase deviation due to the bandpass filters 51 and 52 is cancelled. Here, the equivalent noise bandwidth of the output of the frequency converter 54 is almost equal to that of the signal having passed only the bandpass filter 51.

Therefore, at the point a, the phase error is smaller than that at the point b, which is located following both bandpass filters, but an output with small S/N (equivalent noise bandwidth is broader) can be obtained.

When the output at the point a is divided by 2 by the divider 55, the probability of a phase skip is larger than in the case where the output at the point b is divided by 2 by the divider 56. Since a phase skip due to a ½ divider is 0° or 180°, the polarities at the points a' and b' can be identified by the Exclusive-OR circuit 57. Thus, if the polarity of the output at the point a' is inverted by means of the Exclusive-OR circuit 58, the output at terminal 502 will be equivalent to that at the point b' with regard to phase skip and will also be equivalent to that at the point a' with regard to phase error generated by the filters 51 and 52.

Figure 6:
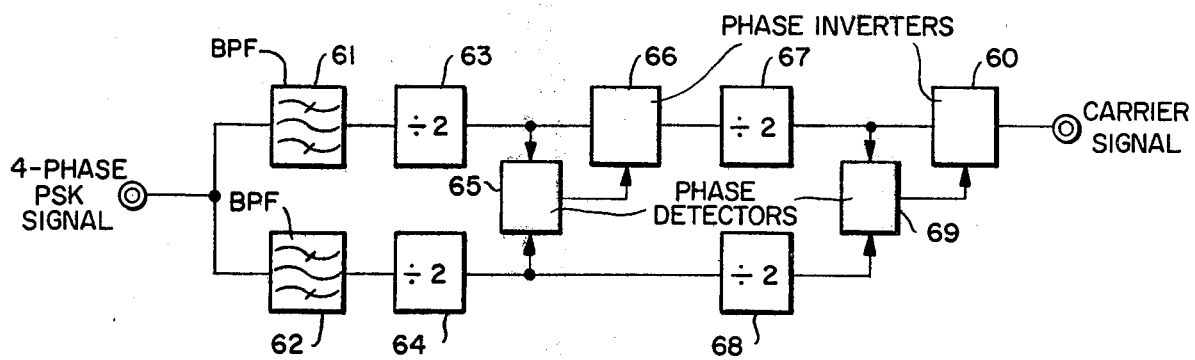
FIG. 6 shows a third embodiment of the invention.

FIG. 6 shows an example where the present invention is adopted to the carrier regeneration circuit of the multiplication system. In this figure, 61 and 62 are bandpass filters; 63, 64, 67 and 68 are ½ dividers; 65 and 69 are phase detectors; and 66 and 60 are phase inverters (using Exclusive-OR circuits). In this embodiment, four phase skips are improved by applying this invention each time the frequency is divided by 2.

In other words, in the case of a 4-phase PSK signal, the carrier is obtained through doubled frequency division by 2. And it is possible that a phase skip can occur at every frequency division and for this reason this invention is adopted for each output of the divider circuits. That is, a phase skip at the divider circuit 63 is corrected by the phase detector 65 and phase inverter 66, and a phase skip generated at the divider circuit 67 can be corrected by the phase detector 69 and phase inverter 60. In the embodiments explained above, the phase is inverted by means of Exclusive-OR circuits. However, if the phase does not change by 180° precisely and a phase error $\Delta\theta$ occurs due to poor performance by the Exclusive-OR circuit, the error rate deteriorates as a function of the above-mentioned $\Delta\theta$. For instance, it is well known that deterioration of S/N due to $\Delta\theta$ in a 2-phase PSK modulation system is about $20\log_{10}(\cos\Delta\theta)$. But such a disadvantage can be avoided by inverting the polarity or switching the channel of the baseband signal after demodulation, in place of directly inverting the phase of the carrier. An embodiment for such a purpose will be explained by referring to FIGS. 7 and 8.

In these figures, 71 is a PSK demodulator; 72 is a circuit for inverting the channel of the baseband signal; and 73 and 74 are polarity inverters. The received PSK signal is connected to the input terminal 75, the regenerated carrier is connected to the terminal 76, the output from phase detector 65 in FIG. 6 is connected to the terminal 77, and the output from phase detector 69 of FIG. 6 is connected to the terminal 78.

Figure 7:
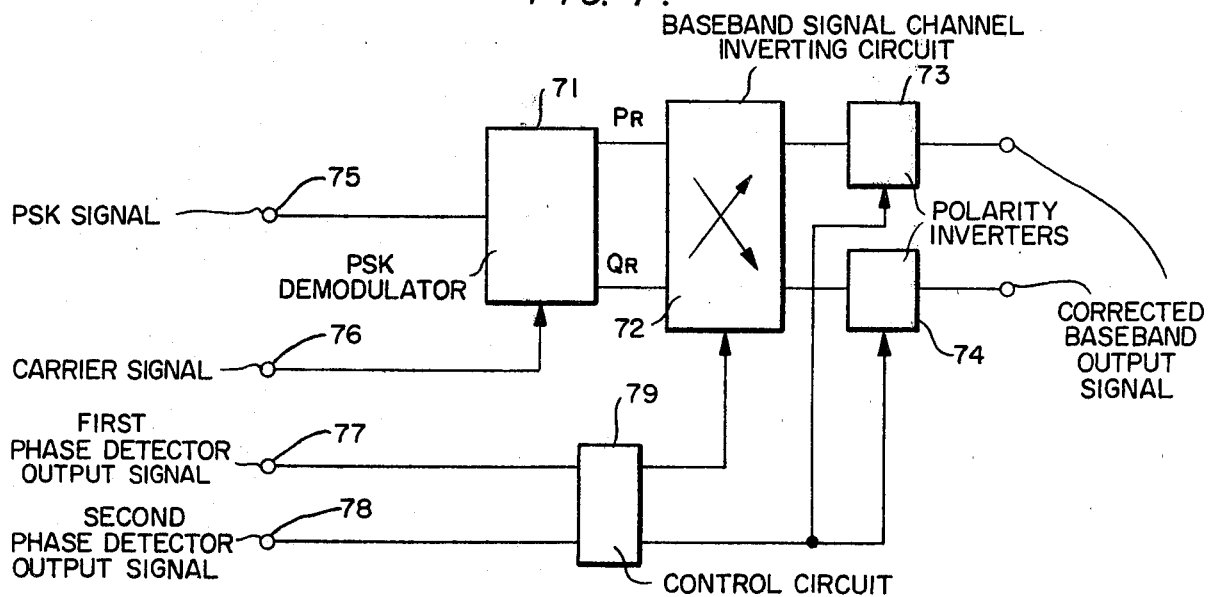
FIG. 7 shows a PSK demodulation system for use with the invention.
Figure 8:
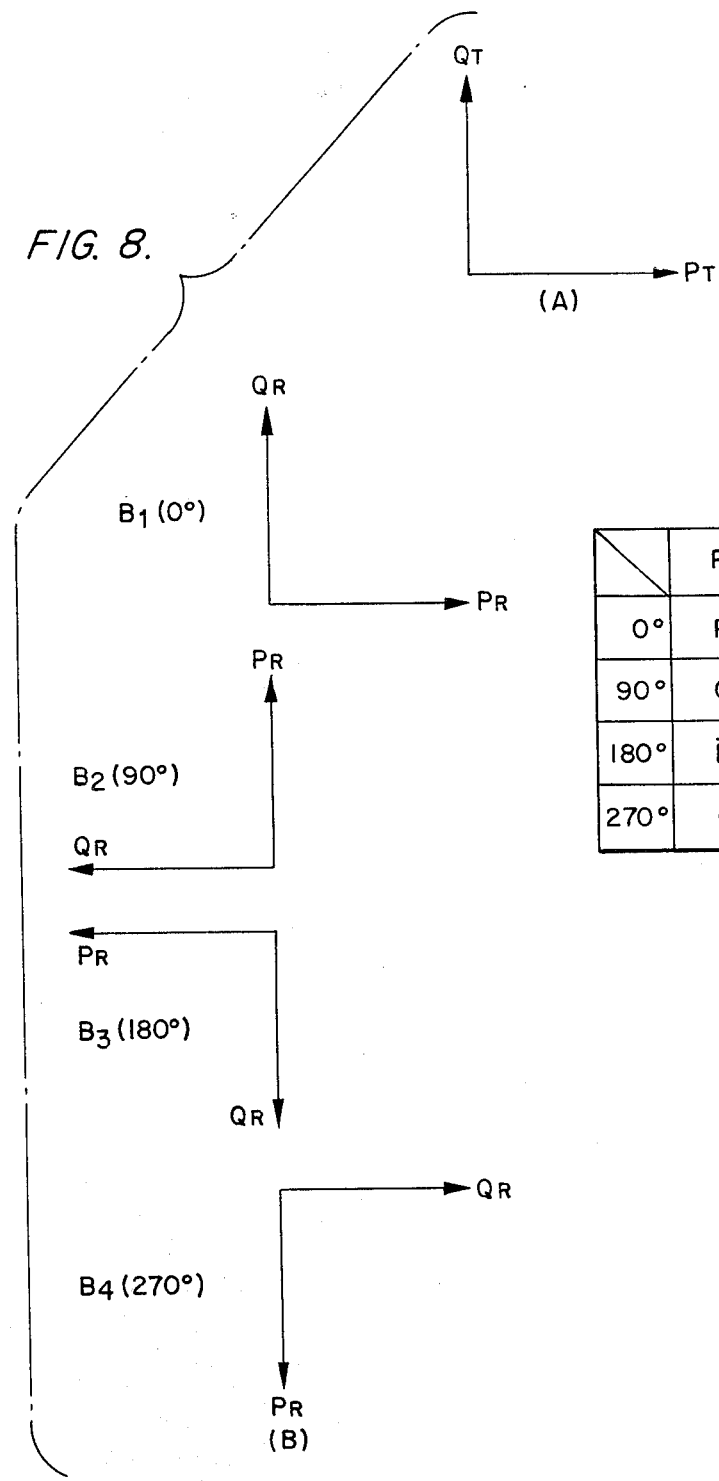
FIG. 8 shows phase relationships between the transmitted carrier and the regenerated carrier.

When it is supposed that the polarity of the outputs of the detectors 65 and 69 in FIG. 6 are plus when the inputs are in-phase and minus when the inputs are out-of-phase, the relation between the polarity at the terminals 77 and 78 in FIG. 7 and the phase of the carrier supplied to the terminal 76 is as shown in Table 1.

TABLE 1

| Terminal 77 | Terminal 78 | Phase of Carrier |
|---|---|---|
| + | + | 0° |
| + | − | 180° |
| − | + | 90° |
| − | − | 270° |

Since this table illustrates how demodulation is influenced by a phase skip, it also indicates whether the two channels of the output of the demodulator 71 should be inverted and whether the polarity should be inverted by the circuit 79 in order to obtain a correct baseband output.

The above process will be explained in detail by using FIGS. 8(A), (B) and (C). The 4-phase PSK signal is composed of the 2-phase PSK signals P and Q having a phase difference of 90°. These two signals P and Q may be demodulated in four ways as shown in (B), depending upon the four kind of phase skips of the carrier. In other words, in the case of $B_1$, the phase skip is 0°, while in the case of $B_2$, 90°, in the case of $B_3$, 180° and in the case of $B_4$, 270°.

Here, $P_T$ and $Q_T$ represent the transmitted signals, while $P_R$ and $Q_R$ represent the received signals, with the relation between them in accordance with the phase of the regenerated carrier being shown in FIG. 8(C). This Figure suggests the kind of correction which should be made for the baseband signal. Namely, when the carrier phase is 0°, no correction is required. In the case of 90°, the channels should be interchanged and the signal $Q_R$ should be inverted. In the case of 180°, the channels are left unchanged and the signs of signals $P_R$ and $Q_R$ are inverted. In the case of 270°, the channels are interchanged and moreover the sign of signal $P_R$ is inverted.

The aforementioned corrections indicate that the transmitted baseband signal has been demodulated. A concrete example for conducting such processes will be explained by returning to FIG. 7.

The signal, having polarities as shown in Table 1, is supplied to the circuit 79. When the polarities of the input signals are + and + respectively, the demodulated baseband signal is allowed to pass directly.

If the polarities are + and −, there is a phase skip of 180°, and the polarities of the two baseband signals are inverted by means of the polarity inversion circuits 73 and 74.

If the polarities are − and +, there is a phase skip of 90°, and after the channel is inverted by the channel inversion circuit 72, the polarities are also inverted by means of the polarity inversion circuit 73.

If polarities are − and −, there is a phase skip of 270°, and after the channel is inverted by the channel inversion circuit 72, the polarities are also inverted by means of the polarity inversion circuit 74.

FIG. 9 shows an example of the improvement in the phase skip when the embodiment shown in FIG. 5 is used for the regeneration of the carrier of a 4-phase PSK modulated signal. The lateral axis represents E/N, while the vertical axis represents an average interval in the occurrence of a phase skip. Here, E means the signal power per bit, while N is noise power density. In this figure, the solid line indicates the characteristic obtained after the present invention is adopted, and the broken line indicates the characteristic before the present invention is adopted, that is, the characteristic where the divider 56 and Exclusive-OR circuits 57 and 58 in FIG. 5 are not used. As is obvious from this figure, in case $E/N = 6$ dB, for example, the average interval of phase skip is improved to $3.3 \times 10^9$ symbols from $1 \times 10^6$ symbols. In other words, the phase skip rate is reduced by about 1/3300.

We claim:

1. A phase correction circuit, comprising:
   first means, having an input point and having first and second output points with different equivalent noise bandwidths, for receiving a signal to be filtered at said input point and for generating therefrom bandpass-filtered signals at said first and second output points;
   phase detector means for detecting the phase difference between signals at said first and second output points; and
   phase shifter means connected to the output of said phase detector means and the output point having the larger equivalent noise bandwidth for changing the phase of the signal at the output point having the larger equivalent noise bandwidth when a phase difference is detected.

2. A phase correction circuit as claimed in claim 1, wherein said first means comprises a first bandpass filter and a first frequency divider series-connected between said input point and said first output point, and a second bandpass filter and a second frequency divider series-connected between said input point and said second output point.

3. A phase correction circuit as claimed in claim 1, wherein said first means comprises a first bandpass filter having an input connected to said input point and an output connected to an intermediate connection point, a second bandpass filter having an input connected to said intermediate connection point and an output connected to the input of a first frequency divider, a frequency converter having a first input connected to said intermediate connection point and a second input connected to the output of said first frequency divider, a second frequency divider having an input connected to the output of said frequency converter and an output connected to said first output point, and a third frequency divider having an input connected to the output of said first frequency divider and an output connected to said second output point.

4. A phase correction circuit, as claimed in claim 1, 2, or 3, wherein said phase detector means and phase shifter means comprise Exclusive-OR circuits.

5. A phase correction system for use when demodulating a multi-phase PSK signal to produce an in-phase signal on a first channel and a quadrature signal on a second channel, comprising:
   means for receiving said PSK signal and for regenerating therefrom bandpass-filtered multiplied signals having different equivalent noise bandwidths at a pair of output points;
   phase detector means for detecting the phase difference between signals at said output points; and
   means responsive to said phase detector means for accomplishing at least one of exchanging the baseband signals on said channels and inverting the baseband signal on at least one of said channels if a phase difference is detected.

6. In a PSK system of the type having a tracking filter means for regenerating a carrier from a PSK-modulated signal, the improvement comprising: said tracking filter means comprises first means responsive to a multiplied PSK signal to be filtered for deriving therefrom a first bandpass filtered signal and a second bandpass filtered signal having a smaller equivalent noise bandwidth than said first signal, second means for detecting whether there is a phase difference between said first and second signals, and third means for correcting the phase of said first signal if said second means detects a phase difference to provide the regenerated carrier.

7. The system of claim 6, wherein said first means comprises first and second bandpass filters having their inputs electrically connected, said first and second bandpass filters having different bandwidths.

8. The system of claim 7, wherein said first means further comprises a first frequency divider connected between the output of said first bandpass filter and said second means and a second frequency divider connected between the output of said second bandpass filter and said second means.

9. The system of claim 8, further comprising a third frequency divider connected to the output of said third means.

10. The system of claim 6, wherein said first means comprises first and second bandpass filters connected in series.

11. The system of claim 6, 7, 8, 9, or 10, wherein said second means comprises a first Exclusive-OR gate having a first input for receiving said first signal and a second input for receiving said second signal, and wherein said third means comprises a second Exclusive-OR gate having a first input electrically connected to the first input of said first Exclusive-OR gate and a second input electrically connected to the output of said first Exclusive-OR gate through a low-pass filter.

12. The system of claim 6, 7, or 8, further comprising fourth means for frequency dividing the output of said third means, fifth means for frequency dividing said second signal, sixth means for detecting whether there is a phase difference between the outputs of said fourth and fifth means, and seventh means connected to the outputs of said fourth and sixth means for correcting the output of said fourth means if said sixth means detects a phase difference.

* * * * *

UNITED STATES PATENT AND TRADEMARK OFFICE
CERTIFICATE OF CORRECTION

PATENT NO. : 4,409,562  
DATED : October 11, 1983  
INVENTOR(S) : Kurihara

It is certified that error appears in the above-identified patent and that said Letters Patent is hereby corrected as shown below:

Col. 2, line 9, after "division" insert --necessary in the circuit--;
      line 10, delete "if necessary";
      line 11, "recover the original input frequency." should be --reduce the requirements on the phase shifter.--;
      line 28, "of" should be --at--;
      line 44, "and" (second occurrence) should be --are--;
      line 53, delete "and" (first occurrence).

Col. 3, line 67, after "dividers" insert --27 and--.

Col. 4, line 1, "divider" should be --dividers 25 and--;
      line 20, change "com-" to --.--;
      line 21, delete entire line;
      line 44, after "output" insert --offset by the--;
      line 45, "filters 51 and 52 is cancelled." should be --filter 52 is obtained.--.

UNITED STATES PATENT AND TRADEMARK OFFICE
CERTIFICATE OF CORRECTION

PATENT NO. : 4,409,562  
DATED : October 11, 1983  
INVENTOR(S) : Kurihara

Page 2 of 2

It is certified that error appears in the above-identified patent and that said Letters Patent is hereby corrected as shown below:

Col. 5, line 14, "In the embodiments" should begin as a new paragraph;
  line 37, "plus" should be --positive--;
  line 38, "minus" should be --negative--.

Col. 6, line 3, "$Q_R$" should be --$P_T$--;
  line 5, "$P_R$ and $Q_R$" should be --$P_T$ and $Q_T$--;
  line 7, "$P_R$" should be --$Q_T$--;
  line 21, "- and +" should be --+ and - --.

Signed and Sealed this

Twentieth Day of March 1984

[SEAL]

Attest:

GERALD J. MOSSINGHOFF

Attesting Officer

Commissioner of Patents and Trademarks